United States Patent [19]

Palfi et al.

[11] 3,790,961

[45] Feb. 5, 1974

[54] RANDOM ACCESS DYNAMIC SEMICONDUCTOR MEMORY SYSTEM

[75] Inventors: Thomas L. Palfi, Cupertino; Charles Brooks, Sunnyvale; George J. Miller, San Jose, all of Calif.

[73] Assignee: Advanced Memory Systems, Inc., Sunnyvale, Calif.

[22] Filed: June 9, 1972

[21] Appl. No.: 261,427

[52] U.S. Cl... 340/173 DR, 340/173 CA, 340/172.5

[51] Int. Cl......................... G11c 11/24, G11c 13/00

[58] Field of Search................ 340/173 CA, 173 DR

[56] References Cited

UNITED STATES PATENTS

| | | | |
|---|---|---|---|
| 3,631,408 | 12/1971 | Hachioji-shi | 340/173 CA |
| 3,646,525 | 2/1972 | Linton | 340/173 CA |
| 3,684,897 | 8/1972 | Anderson | 340/173 FF |
| 3,636,528 | 1/1972 | Morris | 340/173 DR |
| 3,541,530 | 11/1970 | Spampinato | 340/173 DR |

*Primary Examiner*—Terrell W. Fears
*Attorney, Agent, or Firm*—Roger W. Blakely, Jr.

[57] ABSTRACT

A timing and priority assigning system for the automatic operation and refresh of a dynamic semiconductor memory operative with input-output signals characteristic of a magnetic core memory. A timing means is provided for the automatic execution of a read or write command for the semiconductor memory. A second timing system is provided which is initiated by a refresh oscillator so as to periodically and sequentially refresh a portion of the semiconductor memory. A counter is provided to retain the refresh address and to be advanced by a signal from the refresh oscillator. A means is also provided for automatically assigning priority to an externally received read or write command so as to reset a refresh cycle then in operation, or to prevent the initiation of a refresh cycle, until the execution of the command, whereby the refresh cycle is again automatically reinitiated upon the completion of the command.

7 Claims, 5 Drawing Figures

Fig. 1a, Fig. 1b

PATENTED FEB 5 1974 3,790,961

RANDOM ACCESS DYNAMIC SEMICONDUCTOR MEMORY SYSTEM

BACKGROUND OF THE INVENTION

1. Field of the Invention

The present invention relates to the field of digital memories and more particular to the application of semiconductor memories to systems specifically adapted for use with core memories.

2. Prior Art

Previous systems are well-known for the storage of digital information. Punched cards, punched tape, and magnetic tape are well-known means for the storage of such information. However, these means do not provide a random access capability, that is, of providing rapid access to any portion of any memorized data without sequentially passing over certain of the other data, such as by advancing the tapes, etc. Other memories systems provide for a random access capability wherein substantially any storage space or plurality of storage spaces may be accessed by a proper address without having to sequentially pass over the stored information between a given address location and the next address location to be accessed. Heretofore, magnetic core memories have provided a reasonable compromise in terms of cost and access time for random access memories. Therefore, there is presently in existence a large amount of digital equipment which used or is adapted to use core memories.

Another type of random access memory which has recently been developed utilizes MOS integrated circuit technology. The basic unit or chip in such a memory may be comprised of a plurality of memory cells, typically arranged in a matrix for, together with addressing and input/output circuitry. Memories of this type are often operated in a dynamic mode wherein digital information may be stored in the memory cells by appropriate charges capacitively stored on the various lines and gates in the memory cell. The stored information may be subsequently read by applying an appropriate level of excitation to the cell to cause the cell to take one of two possible states, dependent upon the stored charges, so that the stored information may be read out of the memory (or written into the memory by driving the cell to the desired state). The capacitance levels in the memory cell are typically very low and leakage paths will tend to cause the stored charges to diminish to an ambiguous level after a period of time, though each memory cell may be effectively refreshed, that is, the charges replenished by the addressing of the cell. Normal operation of such a memory does not assure that each and every memory cell will be addressed within the required time period and in fact, since the refreshing may be required every few milliseconds, addressing of every memory cell within that period is essentially certain not to occur unless special provision is made therefor.

Memory units of the above type may be organized with the memory cells arranged in a matrix form, that is, in a plurality of rows and columns. In such an organization, a row address may be used to address an entire row, that is, each and every memory cell in that row, with the column address selecting the specific one or ones of the memory cells in the addressed row for reading out of or writing into those particular cells. Thus, addressing a particular row of such a memory may be effective to refresh each and every memory cell in that row without further addressing the columns of that memory unit.

One such dynamic semiconductor memory commercially available is the Advanced Memory Systems 6002 memory, manufactured by Advanced Memory Systems, Sunnyvale, Calif. This memory is a 1024 bit high speed MOS LSI memory having a random access. The unit itself contains 1024 memory cells arranged in a 32 by 32 cell matrix with an apparent external organization of 1024 by 1 bit. As is characteristic of such devices, the MOS memory is capable at operating at much higher speeds than is characteristic of core memories, but requires certain timing signals for the proper execution of a read or write command, and further requires periodic refreshing of each and every line in the memory to assure that the information capacitively stored is not allowed to become lost by the leaking off of the stores charges.

Special systems utilizing the speed and other advantages of these semiconductor memories may readily be designed. However, because of the amount of equipment presently in use specifically adapted for use with magnetic core memories, there is a need for a system to interface the dynamic semiconductor memories with systems adapted to operate in conjunction with magnetic core memories, that is, to operate on receipt of input signals characteristic of those of the core memory and adapted to provide output characteristic of a core memory so as to be compatible with the equipment in which it is used. Thus, upon receipt of a simple read or write command all timing and gating signals required by the simiconductor memory must be automatically created to execute the give command. Furthermore, some provision must be made for the automatic refreshing of the dynamic memory, and still further, it would be preferred if the refreshing could be accomplished in a manner which did not interfere with the availability of the memory for the execution of a read or write command immediately upon receipt of the command. Thus, such a system would extend the potential market for dynamic semiconductor memories by providing the optimum matching of the semiconductor memory to equipment designed to operate in conjunction with core memories.

BRIEF SUMMARY OF THE INVENTION

A timing and priority assigning system for the automatic operation and refreshing of a dynamic semiconductor memory operative with input/output signals characteristic of a magnetic core memory. A timing means is provided for the automatic execution of a read or write command for the semiconductor memory, with the read or write command further being used to gate appropriate signals so as to execute the read or write command at the appropriate point in the timing sequence. A second timing system is provided which is initiated by a refresh oscillator so as to periodically and sequentially refresh a portion of the semiconductor memory. A counter is provided to retain the refresh address and to be advanced by a signal from the refresh oscillator. A means is also provided for automatically assigning priority to an externally received read or write command so as to reset a refresh cycle then in progress, or to prevent the initiation of a refresh cycle during the execution of the command, whereby the refresh cycle is again automatically reinitiated upon the completion of the command. Refresh of the specific dynamic memory used with the system specifically disclosed herein is accomplished by addressing only the lines of the memory. Therefore, the column addresses are gated to the memory only upon the receipt of a read or write command, and the line addresses are gated to the line address signals externally received for the execution of a read/write command and are gated to the refresh counter for the execution of a refresh cycle so as to sequentially refresh each line in accordance with the advance of the refresh counter.

DETAILED DESCRIPTION OF THE INVENTION

Figures 1, 1A, 1B:
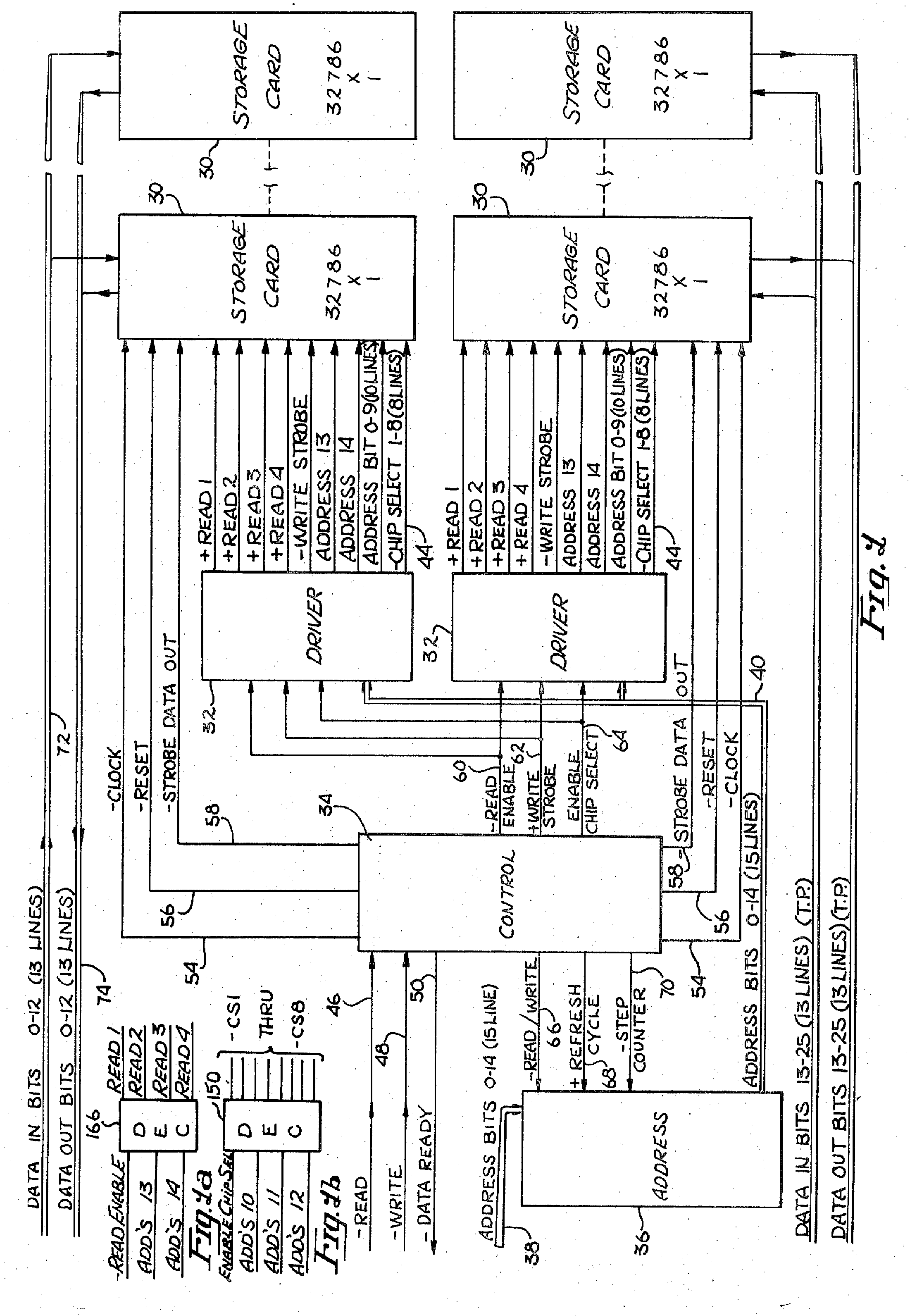
FIG. 1 is a block diagram of the preferred embodiment of the present invention.
FIG. 1*a* is a block diagram of the read decoder used in each of the driver circuits 32.
FIG. 1*b* is a block diagram of the chip select decoder used in each of the driver circuits 32 of FIG. 1.

The present invention is best described with reference to a specific preferred embodiment, whereby the purposes and operation of the invention may be specifically illustrated. Thus, in the explanation to follow, specific circuits and the operation thereof will be described with respect to a particular dynamic memory, these circuits being for the addressing, timing and generation of other signals required to operate the memory and maintain the memory in a refreshed condition. Positive and negative logic signals are indicated in the figures, and in many cases shall be specifically described as such with reference to the circuits as used in this preferred embodiment, it being understood that the specific embodiment described in detail herein is described for purposes of explanation only, and that various changes in arrangement of circuits and details of operation may readily be provided by one skilled in the art as a specific need might arise.

The system hereinafter described is particularly suited for use with a 1024 bit high speed MOS LSI random access dynamic memory manufactured by Advanced Memory Systems, Inc., 1276 Hammerwood Avenue, Sunnyvale, Calif., and commonly referred to as their AMS 6002 dynamic memory. This memory is a high speed dynamic memory requiring periodic refreshing, and requiring particular timing, addressing and other signals for proper reading into or writing out of the memory. An important feature of this memory in comparison to magnetic core memories is its speed of operation, which allows the fabrication of a memory system, in accordance with the present inveniton, which may be used as an interchangeable replacement for magnetic core memories. In particular, the 6002 has a sufficiently high speed to allow for the execution of a read or write operation and the completion of the refresh operation, all within a portion of the time period normally attributable to the read or write operations in the magnetic core memory. One very important aspect of the present invention, as will be subsequently explained in detail herein, is the assigning of priority to an external read or write command, with the result that a refresh operation, if under process, is terminated while the read or write command is executed, and then immediately re-initiated so as to assure adequate refreshing of the memory. Similarly, if a read or write operation is in progress when a refresh cycle would normally be initiated, the refresh cycle is delayed until the read or write operation is completed. Thus, substantially immediate random access to the memory is achieved, while the internal refreshing is accomplished at a time and in a manner so as to not interfere with the substantially immediate execution of the read or write operation, all while assuring the execution of the required refresh cycle to avoid loss of the data stored in the memory.

The AMS 6002 is a 32×32 array of dynamic memory cells addressable through a 5 bit addressing signal to address one of the 32 rows, and a 5 bit column addressing signal to address one of the 32 columns, thereby providing an apparent external organization of 1024 × 1. overall system, to be described specifically herein, uses 832 of the AMS 6002 units to provide an 851,968 bit memory capacity with a 32,768 × 26 bit organization.

First referring to FIG. 1, a block diagram of the complete memory system using the AMS 6002 integrated circuits and the dynamic memory interface means of the present invention may be seen 26 memory cards 30, each having an apparent 32,768 × 1 organization, are controlled through signals derived in part from a pair of drivers 32 and in part from signals derived directly from the control circuit 34, which is the heart of the present invention. The drivers 32 are primarily for the purposes of amplifying the various signals to provide sufficient drive to supply the required information to the 26 storage cards. Thus, depending upon system design, only one driver might be used, or the circuit function of the driver placed either on the storage cards or directly on the control 34. In addition, however, the driver circuits in this embodiment also include certain of the addressing circuits. Thus, it may be seen that a full address for the memory is comprised of a 15 bit address coupled into the address circuit 36 on 15 lines 38, and on receipt of a read or write signal are coupled therefrom on the 15 lines 40 into each of the driver circuits 32. The first 10 of these address signals (address bits 0 through 9) are merely buffered in the driver circuits 32 and coupled directly to each of the storage cards. The next three address bits, that is, address bits 10, 11 and 12 are fully decoded (and gated) and then buffered in the driver circuits 32 so as to provide eight fully decoded chip select signals on lines 44 coupled directly to each of the storage cards 30. The chip select signals are actually negative logic signals and therefore a minus sign is indicated in FIG. 1. (Similarly, throughout this description, logic signals may be either characteristically positive or negative, and negative logic signals are appropriately indicated by a minus sign preceding the signal designation in the various figures). The last two address bits, that is, address 13 and 14, are also decoded (and gated) in the driver circuits 32 and coupled to each storage card both in the uncoded form as address 13 and 14 and in the fully decoded form as read signals READ 1 through READ 4. Thus, in summary, the 15 bit address is coupled to each storage card 30 in some form, specifically, the first ten bits (0 through 9) are coupled to each storage card without decoding, the next three bits of the address (10, 11, and 12) are decoded and coupled to each storage card only in the fully decoded form, and the last two bits (13 and 14) are decoded and coupled to each storage cards both in the fully decoded form and in the coded form. Details of the decoding and gating on the driver circuits are shown in FIGS. 1a and 1b and more fully described later. However, for purposes of refreshing the memory when no external command signal is being executed, the address coupled from the address circuit 36 to the drivers 32 is an internally generated partial address, as shall be subsequently described in more detail.

The control circuit 34 has as its inputs, a read signal on line 46, a write signal on line 48, both of which are negative logic signals and are mutually exclusive signals, and provides as an externally available output, a data ready signal on line 50. The control circuit 34 provides internal outputs coupled directly to each of the storage cards such as clock signals on lines 54, a reset signal on lines 56 and a strobe data out signal on line 58. It also provides a read enable signal on line 60, a write strobe signal on line 62, and an enable chip select signal on line 64, which are coupled to the driver circuits 32. As previously mentioned, the driver circuits 32 contain certain decoders which decoders are clocked decoders. Thus the read enable signal on line 60 is in essence the clock signal for the decoder operating on the address bits 13 and 14 to provide the READ 1 through READ 4 decoded outputs. Similarly, the enable chip select signal is in essence the clock signal for the chip select decoder, which decodes address bits 10 through 12 and provides the eight chip select signals at the driver circuit output (the write strobe signal on line 52 is merely buffered and inverted in the driver circuit 32 for coupling to each storage card). The control circuit 34 also provides a read/write signal on line 66 (the zero state representing the receipt of an external read or write command and a one state representing no external command), a refresh cycle signal on line 68 and a step counter signal on line 70. The generation and function of these last signals shall be particularly described in detail herein, as their function is extremely important to the operation of the present invention.

Separate input and output lines are provided to each storage card for coupling one bit of information into or out of each storage card during each cycle of operation of the memory. Thus, there are a total of 26 input lines 72 and a total of 26 output lines 74 coupled to the system. The external signals coupled to the system are 26 data input lines, 15 address lines, a read command line and a write command line. The output signals from the system comprise 26 data output lines and a data ready line. Thus, the input and outputs are substantially compatible with core memory command signals, and all timing and refreshing functions required for the proper operation of the dynamic memory are provided within the system shown in FIG. 1. Furthermore, as shall be subsequently seen, these functions are provided while still allowing priority to an externally received command so as to not interfere with the substantially immediate operation of the circuit in response to an external command.

The AMS 6002 is a 32 × 32 dynamic memory in which digital information is stored as a result of static charging of various lines in the memory cells of the memory. These static charges tend to leak off with time and therefore each memory cell in the memory must be periodically refreshed by activating that memory cell so as to return the memory cell to a bi-stable flip-flop, thereby replenishing the static charges before the charges are depleted so that the previous state of the flip-flop is not lost before reactiviating the cell. This may be done by addressing each and every row of each AMS 6002 within a given time period, since addressing a particular row in a memory (together with supplying appropriate clock and reset signals) refreshes all 32 memory cells in the particular row. This may be done without interfering with the output of the various storage cards since the columns are not addressed and no new information is presented at the storage card output unless a chip select signal (which in essence is the clock signal for the column decoders in the memory) is also supplied to the storage cards.

Figure 2:
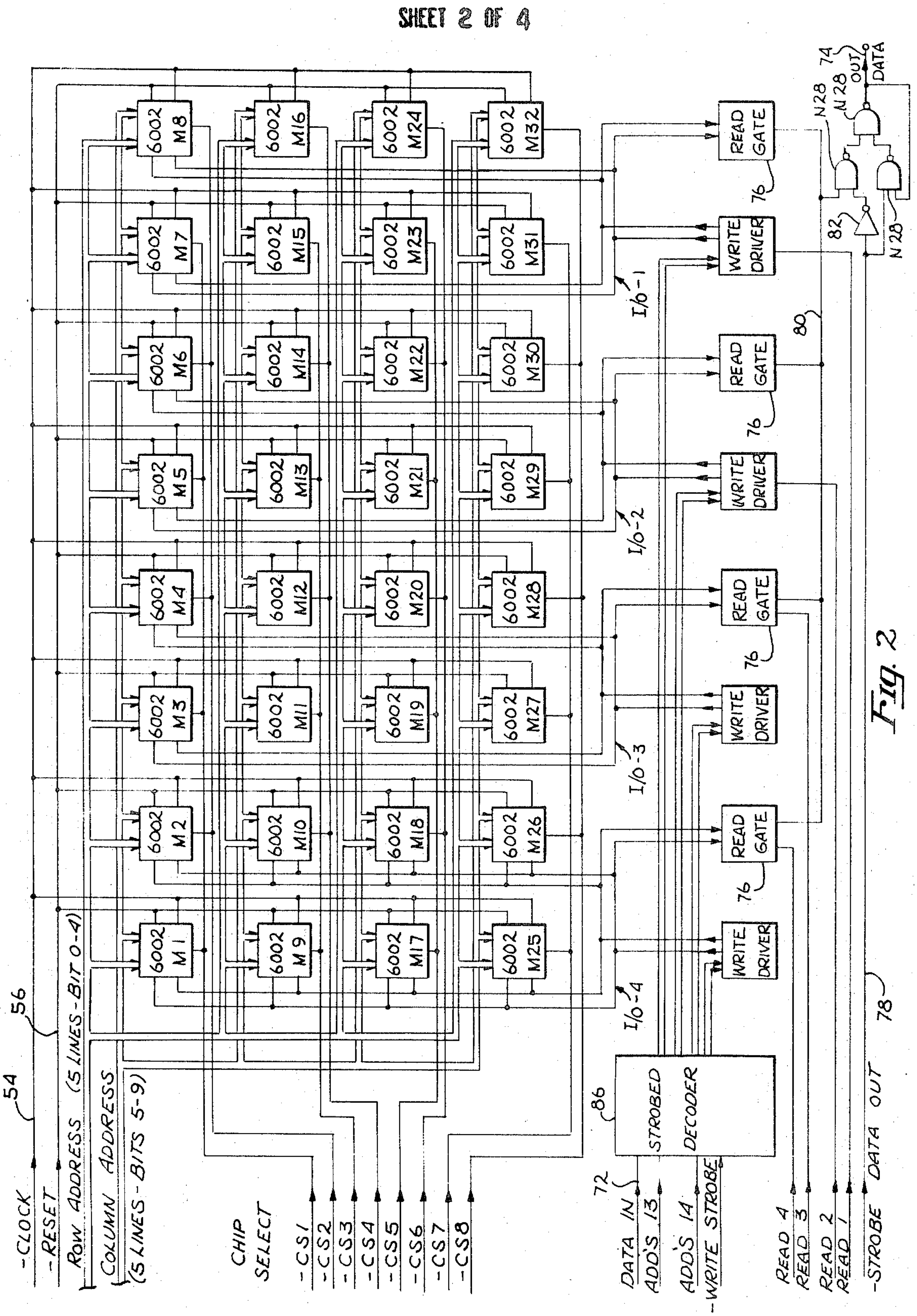
FIG. 2 is a block diagram of each of the storage cards 30 of FIG. 1.

Now referring to FIG. 2, a block diagram indicating the organization of each storage card may be seen. Each storage card has 32 6002 dynamic memories which are identified in the figure as M1 and M32. Each 6002 is coupled to the clock signal on line 54, the reset signal on line 56, as well as to the row address signal (bits 0 through 4) and the column address signals (bits 5 through 9) of the 15 bit address signal. Thus, it may be seen that all lines of all 6002 devices of all memory cards are addressed and will be refreshed, assuming appropriate clock and reset signals are provided, merely by cycling the five bit row address through all possible addresses, (e.g., through the 32 possible combinations to address the 32 rows). The input/output lines of the 6002 are grouped so that there are four sets of input/output lines, each serving or coupled to the eight 6002's in a respective pair of columns. Thus, the input/output lines I/0-4 are common input/output lines for the 6002's M1, M2, M9, M10, M17, M18, M25, and M26. The eight chip select signals CS1 through CS8, which are the column address clock signals as well as the gate signal gating the addressed memory cell in respect to 6002 to its input/output lines, are each coupled to every other 6002 in a corresponding row of 6002's. Thus, the chip select signal CS1 (a negative logic signal) provides a chip select signal to the memory devices M1, M3, M5, and M7, CS2 provides a chip select signal to M2, M4, M6, and M8, etc. Thus the addressed cell in memory device M1 is coupled to the input/output lines I/0-4 by a chip select signal on CS1, while at the same time the addressed cell in memory device M3 is coupled to the input/output lines I/0-3, etc., so that only four memory devices are fully addressed simultaneously.

A full address will only be presented to each memory card when either a read or write operation is to be executed. For purposes of reading, one of the four pairs of input/output signals, that is, one of the pairs of signals on the input/output lines I/0-1 through I/0-4 will be coupled to line 80 as a single ended output by a respective one of read gates 76 as a result of gate signals READ 1 through READ 4, each coupled to one of the read gates. Also a strobe data out signal is timely received on line 78 to strobe the single bit of digital information out on line 74. The strobe data out signal is a pulse which couples the signal from the respective one of the read gates 76 through lines 80 to the data output latch comprised of inverter 82 and NAND gates N28 (the input/output lines such as I/0-1 are line pairs and therefore potentially have four output states. However, these line pairs represent the true and false output of the memory cell so that the only allowed states are the zero-one and one-zero states, with the read gates 76 being adapted to provide a single ended output on line 80 depending on which of the two allowed states exist on the input/output lines).

To write data into the memory, a three bit strobe decoder 86 provides a write command to the appropriate one of the eight input/output lines (four pairs of lines) with the write strobe strobing in the information at the right time. It is to be noted that only a two bit address is presented, that is, address bits 13 and 14, which when decoded select the desired pair of output lines I/0-1 to I/0-4. The third bit of information is the data itself, which when used as a least significant figure for the three bit binary address, commands the writing of a one into the desired one of the I/0 lines.

Figures 3, 4:
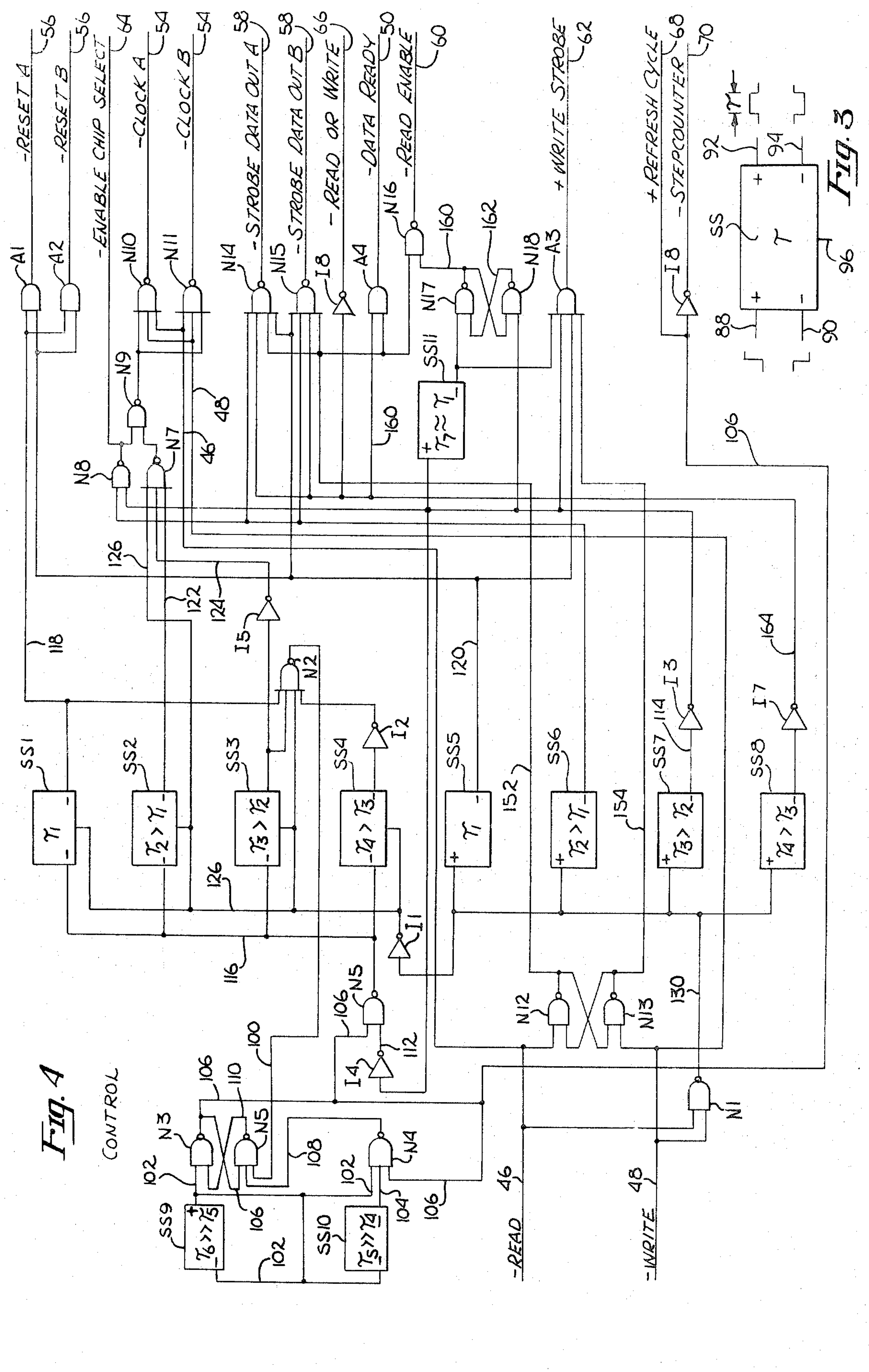
FIG. 3 is a block diagram illustrating the representation of the single shots used in FIG. 4.
FIG. 4 is a logic diagram for the control circuit 34 of FIG. 1.

In the figures and description to follow, (and in the output latch of FIG. 2) standard logic symbols are used, wherever possible, for standard logic functions to simplify the explanation. There is also used in the figures, particularly FIG. 4, a plurality of flip-flops, each having capacitive coupling between an appropriate pair of terminals thereof, so as to operate as a mono stable flip-flop, sometimes referred to as a single shot oscillator. The specific flip-flop used in the preferred embodiment may be the commercially available devices manufactured by Fairchild Semiconductor located at Mountain View Calif. and sold as their part nos. 9602 and 2062. The basic representation for the device when connected as a single shot, as will be used herein, is shown in FIG. 3. A single shot, which shall be generally referred to by the identification SS, and subsequently more specifically referred to by the identification SS followed by a specific number identifying a specific single shot, has five signal terminals, that is, terminals 88, 90, 92, 94 and 96. The single shot is activated when ever the signals on terminal 88 goes to the high state or whenever a signal applied at terminal 90 goes to the low state, provided the reset signal on terminal 96 is in the high state. Since the device operates as a mono stable flip-flop, inputs on both terminals 88 and 90 are not used. The output of the single shot is either a positive logic pulse with a time duration $\tau$ as shown for the positive terminal 92, and a negative pulse on terminal 94, having the same duration. Thus, the possible inputs and outputs, except for the inhibit signal on terminal 96, are shown diagrammatically in FIG. 3. The time duration $\tau$ is selected by RC network appropriately connected.

Now referring to FIG. 4, the logic circuit for the control circuit 34 shown in block diagram form in FIG. 1 may be seen. This circuit provides a multitude of functions, including the generation of the timing signals both for a read or write operation and for refreshing, creates periodic refreshing signals to initiate and accomplish the refresh function and automatically gives priority to an external read or write command so as to execute the externally initiated command while still assuring proper refresh of the memory. The read and write commands to the circuit are basically negative logic signals, and when neither a read nor a write command is being received, both of the inputs on lines 46 and 48 will be in the high state. Thus, the output of NAND gate N1 will be in the low state, causing the output of inverter I1 to be in the high state. In this condition, none of the single shots SS1 through SS4 are inhibited, (e.g., reset). Assuming that the refresh system is between cycles, the outputs of the single shots SS1 through SS4 will all be in the high state. However, the outputs of SS4 is inverted by inverter I2, so as to cause one of the inputs of NAND gate N2 to be in the low state, thereby causing the output of the NAND gate on line 100 to be in the high state.

Single shot SS9 is in reality connected as a multivibrator, since its positive output is coupled to its negative input. Thus, at the end of the time period $\tau_6$, when the positive output changes to the low state, the negative pulse is coupled to the negative input of the single shot, thereby immediately reinitiating a positive output pulse on the positive output line 102. (The specific output lines for specific single shots are renumbered as compared to the representation in FIG. 3, so as to be useable to identify specific lines in FIG. 4 and the interconnection of the logic elements). The time constant $\tau_6$ of the single shot SS9 is relatively long compared to the time constants of all other single shots in the circuit. Thus, single shot SS9 provides the basic command signal for initiating each refresh cycle. The time constant of single shot SS10 is relatively long compared to the single shots SS1 through SS8 and SS11, which provide the refresh and read and write timing signals as shall be subsequently seen, but is relatively short compared to the time constant of SS9. Thus, the output on line 104 of signal shot SS10 is normally in the high state. It may be shown that the output of NAND gate N3 on line 106 must be in the low state at this time. Thus, one of the inputs to NAND gate N4 is in the low state causing a high output of the NAND gate on line 108. The output of NAND gate N5 is high, since one of its inputs, that is, the signal on line 106 is in the low state. Thus, both inputs of NAND gates N3 are in the high state causing the output on line 106 to be in the low state as hereinbefore stated. This is shown on the first line of the table below:

LOGIC STATES–NO EXTERNAL COMMANDS

| 100 | 102 | 104 | 106 | 108 | 110 | |
|---|---|---|---|---|---|---|
| + | + | + | − | + | + | awaiting next refresh cycle. |
| + | − | − | + | + | − | SS9 firing ($T=0$). |
| + | + | − | + | + | − | immediately after SS9 fired. |
| − | + | − | − | + | + | end refresh ($\tau_4 > T > \tau_3$). |
| + | + | − | − | + | + | after end refresh, before SS10 fires ($\tau_5 > T > \tau_4$). |
| + | + | + | − | + | + | SS10 fired ($\tau_6 > T > \tau_5$). |

(It may be noted in the preceding table that the signal on line 108 does not change during the normal cyclic operation of the system. Single shot SS10 and NAND gate N4 are provided however, to prevent the system from assuming and becoming hung up in an undesired state upon the initial application of power to the system).

When the single shot SS9 fires, the states of the various signals on lines 100 through 110 changes to the condition shown in the second line of the above table. For reference this time will be considered time T = 0. The firing of single shot SS9 immediately resets the single shot because of the coupling of its output directly back to its input, but in the meantime it has set the flip-flop comprised of NAND gate N3 and N5 as shown in the third line of the above table.

Assuming a read or write operation is not in progress, single shot SS7 will have its output on line 114 in the high state. This output is coupled to line 112 through a pair of inverters I3 and I4 so that the second input to NAND gate N5 is in the high state. Thus, when the signal on line 106 goes to the high state when single shot SS9 fires, the output on line 116 goes to the low state, triggering the single shots SS1 through SS4. (Since there is neither a read nor a write signal on lines 46 and 48, respectively, the output of NAND gate N1 is low, thereby causing the output of inverter I1 to be high and none of the single shots SS1 through SS4 to be inhibited). The firing of single shot SS1 by the signal on line 116 causes a negative pulse of time duration $\tau_1$ on line 118 coupled to NAND gate N7 and N8. At this time, the single shot SS5 has not been fired so that the output of SS5 on lines 120 is in the high state. Thus, for the time duration $\tau_1$ of the single shot SS1, one of the inputs to AND gate A1 and A2 is changed to the low state and thus a negative pulse of time duration $\tau_1$ is provided on lines 56 to provide the desired negative logic reset pulse.

During this time, the output of single shots SS2 through SS4 are also in the negative state. Thus, the signal on line 122 is in the low state and the signal on line 124 is in the high state, having been inverted by inverter I5. Also, the signal on line 126, the inhibit signal, is in the high state. Thus, one input, that is, the signal on line 122 to NAND gate N7 is low, causing the output thereof to be in the high state. Similarly, since the output of inverter I3 is in the low state, one input to NAND gate N8 is in the low state so that the output of NAND gate N8 is also in the high state. Thus, the signal on line 64 is maintained in the high state, whereas the output of NAND gate N9 in the low state. This causes the output of NAND gate N10 and N11, that is, the clock signals on lines 54 to be in the high state. When single shot S2 resets, its output returns to the high state, thereby causing the output of NAND gate N7 to change to the low state, the output of NAND gate N9 to change to the high state and the negative logic clock pulses to be initiated on lines 54 (assuming that there is neither a read or a write signal on lines 48). When single shot SS3 returns to the set position, its output changes to the high state, thereby causing the signal on line 124 to change to the low state, again changing the outputs of NAND gates N7, N9, N10 and N11, terminating the clock pulses on lines 54. At this time, the output of single shot SS4 is still in the low state and the output of inverter I2 in the high state, so that between time periods $\tau_3$ and $\tau_4$ all inputs to the NAND gate N2 are in the high state and a negative pulse is received on line 100 to reset the flip-flop comprised on NAND gates N3 and N5. This negative pulse on line 100 terminates at time $T = \tau_4$ when single shot S4 resets and the output of inverter I2 goes to the low state. The momentary negative pulse on line 100 causes a resetting of the flip-flop. The conditions during the negative pulse is shown in the fourth line of the preceding table and the conditions immediately following the pulse are shown on the fifth line of the table. This pulse signifies the end of the refresh cycle for one line (the refresh cycle comprising a reset pulse and a clock pulse properly timed and occurring during the addressing of the respective line in the memory). After the completion of the refresh cycle, the single shot SS10 will reset as shown in the last line of the above table.

It may be seen from the above, that at the end of the refresh cycle, the signal on line 106 changes to the low state, thereby causing the output on line 68 to change to the low state and the output of inverter I6 to change to the high state. As will be subsequently seen the change of the signals on line 70 advances a counter in the address circuit 36 (FIGS. 1 and 5) so as to advance a counter containing the refresh line address, so as to address the next line in the memory for purposes of the next refresh cycle. Thus, it may be seen that the periodic firing of single shot SS9 creates a series of pulses to provide the desired reset and clock pulses for refreshing, and to provide at the end of each refresh cycle a signal which may be used to advance a refresh address counter. (It will be subsequently shown that the refresh cycle signal appearing on line 68 is used for gating purposes. To gate the output of the refresh counter, that is, the step counter as identified in the figures to the first five address bits to address the various lines in the memory in accordance with the output of the step counter).

It may be seen from FIG. 2 and the explanation relating thereto, that one difference between a read operation or a write operation is whether a strobe data out signal is provided on line 78 or a write strobe signal is provided to the strobe decoder 86. Otherwise the memory is fully addressed in the same manner and the timing signals to achieve either of these operations are the same. Thus, when either a read or a write signal is received, the output of NAND gate N1 on line 130 changes to the high state. This fires single shots S5 through S8 (having approximately the same time constants as SS1 through SS4 respectively) in exactly the same manner as previously described with respect to the firing by a pulse on line 116, of the single shots S1 and S4. Thus, the reset signals are generated in the same manner on lines 56, resulting from a change to the low state on line 120 for time period $\tau_1$ of single shot SS5. Similarly, the reset signal on lines 56 is followed by the clock signals on lines 54, this time, however, resulting from the change in state of NAND gate N8 instead of NAND gate N7, resulting in an enable chip select signal on line 64 coincident with the clock signals. This enable chip select signal enables a decoder 150 within driver 32, as shown in FIG. 1b, to decode the address bits 10, 11 and 12 to provide one of the eight chip select signals CS1 and CS8 to address the appropriate column of four of the 32 6002's on each storage card 30. Thus, either the read or the write signal provides the reset and clock signals and further provide for the complete addressing of the select memory devices.

When an externally applied read command is received on line 46, the flip-flop comprised of NAND gates N12 and N13 is caused to assume a state whereby line 152 is in the high state and line 154 is in the low state. This disables the write strobe on line 62 through AND gate A3 and enables the strobe data out signals on lines 58 through NAND gate N14 and N15, as well as enabling the data ready signal on line 50 through AND gate A4 and the read enable signal on line 60 through NAND gate N16.

The other inputs to the NAND gates N14 and N15, required to be in the high state to give the strobe data out signals, are the outputs of the single shots SS5 and SS6 as well as the output of inverter I7 coupled to single shot SS8. Thus, the strobe data out signals on lines 58 will be in the negative state in the time interval after single shot SS6 resets and before the single shot SS8 resets, that is, between time $T = \tau_2$ to $T = \tau_4$. The outputs of both single shots SS5 and SS6 are coupled to the NAND gates controlling the strobe data signals, since in the preferred embodiment, not only is the time duration of the pulse of the single shots $\tau$ adjustable to the desired value, but the single shots also have a controllable leading edge on the output pulse so that the leading edge position may be controlled as desired within at least a relatively small range. Also, since the single shots SS5 through SS8 are activated on either a read or a write command, a signal indicating either external command, that is, a read or write command, is achieved on line 66 throughout the time period of the read or write operation, that is, throughout the full time period of single shot SS8, through inverter I7 and inverter I8.

When single shot SS7 is initially triggered upon receipt of the read (or write) signal, single shot SS11 is fired through inverter I3. Thus, the output of the single shot SS11 is driven negative for a time duration $\tau_7$ which is on the order of the time duration $\tau_1$ of single shots SS1 and SS5. This sets the flip-flop comprised of NAND gate N17 and N18 so as to cause the signal on line 160 to be in the high state, thus enabling the read enable signal on line 60 through NAND gate N16. At the same time, the signal on line 162 changes to the low state so that the signal on line 160 will remain in the high state even when the output of single shot SS11 returns to the high state. The flip-flop (gates N17 and N18) is reset to cause the read enable signal on line 60 to return to the high state at time $\tau_3$ by the resetting of single shot SS7 at that time. During the period of the read enable signal, decoder 166 shown in FIG. 1*a* is enabled so as to decode the address bits 13 and 14 to provide the read signals, READ 1 through READ 4, thereby gating the appropriate one of read gates 76 shown in FIG. 2. Finally, at time $\tau_4$ when single shot SS8 resets so that its output returns to the high state, the output of inverter I7 on line 164 changes to the low state. Thus, the read or write signal on line 66 from the output of inverter I8 changes to the high state indicating the end of the externally commanded read (or write) signal. Also, the strobe data out signals on lines 58 are terminated and the data ready signal on line 50 is initiated through AND gate A4.

A busy signal is provided on line 52 which is an externally assessable signal which may be used to indicate that a read or write operation is in process. This signal is provided through NAND gate N19 and provides a low state output until either single shot SS7 or single shot SS8 returns to the reset position, thereby causing at least one low state input to NAND gate N18.

The operation of the circuit in the case of the execution of a write command is in the most part identical with respect to the operation for a read command. However, in the case of a write command the flip-flop comprised of NAND gates N12 and N13 is caused to take the opposite state, with line 152 being in the low state and line 154 being in the high state. This enables the write strobe through AND gate A3 and disables the read enable signal on line 60 through NAND gate N16, the data ready signal on line 50 through AND gate A4, and the strobe data out signal on line 58 through NOR gates N14 and N15. Instead of these signals, a write strobe is provided on line 62 through AND gate A3 which is initiated at time $\tau_7$ (or time $\tau_1$ through typically $\tau_7$ is specifically chosen to be slightly greater than $\tau_1$) and terminates upon the resetting of single shot SS7.

Whenever an external read or write command is received, the output of NAND gate N1 changes to the high state and the output of inverter I1 changes to the low state, thereby resetting the single shots SS1 through SS4. If a refresh cycle was in process at the same time the output of single shot SS7 changes to the low state causing the output of inverter I3 to take the high state, the output of inverter I4 to go to the low state, thereby disabling the signal on line 106 so as to clamp the line 116 in the high state, preventing the reinitiation of the refresh cycle until single shot SS7 resets, thereby indicating the effective completion of the read or write operation. Immediately thereafter, a refresh cycle which was in process when the external command was received, or which was tentatively commanded by the firing of single shot SS9 during the execution of the external command, is fully reexecuted. Since a read or write operation, as well as the refresh operation, for the semiconductor memory may be accomplished in only a fraction of the normal read or write time or a core memory, there is ample time to partically execute a refresh cycle, fully execute an externally commanded operation, and then totally reexecute the interrupted refresh cycle. Only on completion of the refresh cycle does a signal occur on line 100 thereby resetting the flip-flop comprosed of NAND gates N3 and N5 in readiness for the next pulse from single shot SS9.

Figure 5:
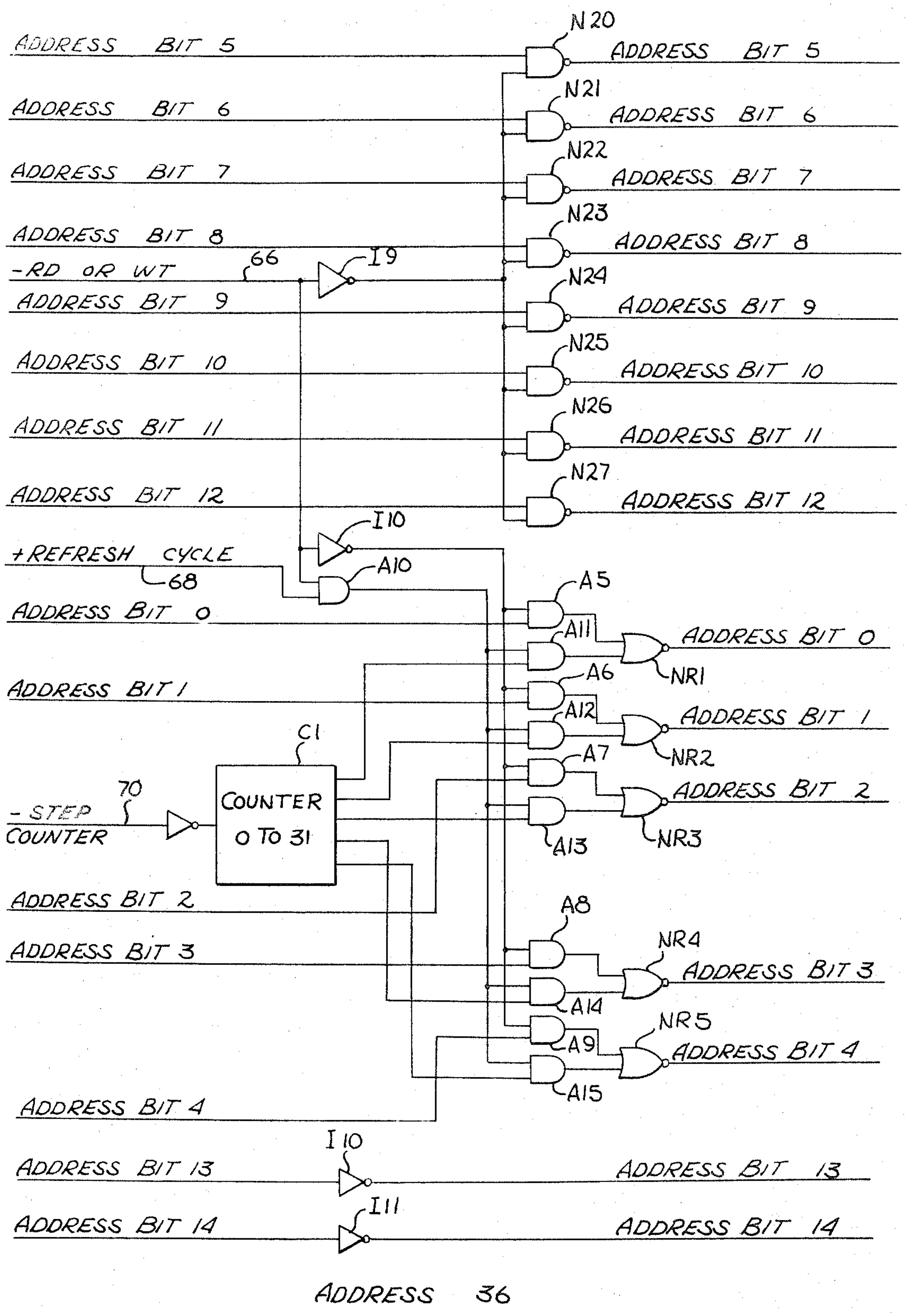
FIG. 5 is a logic diagram for the address circuit 36 of FIG. 1.

Now referring to FIG. 5, the address circuit 36 may be seen. The address signals for address bits 5 through 12 are gated to the driver circuit 32 through NAND gates N20 through N27 by the read or write signal on line 66 through inverter I9. Thus, only when an externally commanded read or write operation is in process are the address bits 5 through 12 coupled to the driver. Consequently, these address bits which represent the column address bits for all the AMS 6002's as well as the chip select bits, are not coupled to the driver circuit 32, and the memory is not addressed during refresh except for bits 0 through 4 which are merely the row address bits. Similarly, address bits 0 through 4 are gated through AND gates A5 through A9 and NOR gates NR1 through NR5 to the driver circuit. (All address bits being inverted in the address circuit, including address bits 13 and 14 by inverters I10 and I11. The gating of the address bits I13 and I14 is accomplished by the write strobe signal in the strobe decoder 86 shown in FIG. 2). When neither a read or a write signal is being executed, the read or write signal on line 66 will be in the high state. Thus, when a refresh cycle is commanded, the signal on line 106 (FIG. 4) will change to the high state and thus the refresh cycle signal on line 68 will also be in the high state, causing the output of AND gate A10 to be in the high state, thereby gating the output of counter C1, which is a 5 bit binary counter, through AND gates A11 and A15 and NOR gates NR1 through NR5 to the output. Thus, it may be seen that during refresh, the address provides by the addresss circuit 36 for address bits 0 through 4 is controlled by counter C1 which may be advanced by the step counter signal on line 70 for each refresh cycle, whereas these outputs, as well as the output for address bits 5 through 12 are as externally controlled during any read or write operation. Counter C1 is advanced by the step counter signal on line 70 through inverter I11, as well as in inverter I8 of FIG. 4, so that the counter is advanced by one count at the end of each refresh cycle. The counter itself is a 0 through 31 counter, so as to sequentially cycle through all 32 combinations of the five address bits 0 through 4 so as to sequentially address each and every line in the memory.

There has been described hereabove a specific embodiment of the present invention which provides interfacing required to make a dynamic semiconductor memory interchangeable with a magnetic core memory. The present invention provides all timing and controls circuits required to immediately execute a read or write command signal to provide the desired output without time delay or interruption for purposes of refreshing the memory. The present invention further provides for the automatic refreshing on a periodic basis to assure that the dynamic memory is adequately maintained, doing this, however, on a nonpriority basis, whereby priority is automatically assigned to an external command signal until the commanded operation has been fully executed. The time delays of the various single shots in the specific embodiment may be readily selected to achieve the timing and time duration of the various signals generated by the present invention in accordance with the recommendations of the manufacturer for the AMS 6002. Variations in these timing signals, as well as alternate embodiments of the present invention may readily be fabricated by one skilled in the art to achieve a memory of a different capacity and/or organization and/or a memory utilizing a basic memory device other than the AMS 6002. Thus, while the present invention has been specifically disclosed and described with respect to a specific embodiment, a specific memory organization and a specific basic memory device, it will be understood by those skilled in the art that various changes in form and details may be made therein without departing from the spirit and scope of the invention.

We claim:

1. A means for providing automatic operation of a dynamic semiconductor memory comprising:

first means coupled to said memory and at least one read or write input line, which may have a command signal thereon, for generation of at least one timing signal for the execution of the command in said memory in response to said command signal;

second means coupled to address input lines, a command signal line, and said memory for coupling an address to said memory upon the occurrence of said command signal;

third means coupled to said memory for periodically initiating at least one timing signal for the refreshing of at least a portion of said memory;

fourth means for counting coupled to and responsive to said third means;

fifth means coupled to said third means, said fourth means and to said memory, said fifth means being responsive to said third means to sequentially address a portion of said memory for refreshing in accordance with the output of said fourth means;

sixth means coupled to said third means and said memory initiated by said third means for the generation of at least one timing signal for the execution of a refresh operation; and seventh means coupled to said first means and said sixth means for resetting said sixth means during the operation of said first means.

2. The means of claim 1 further comprised of an eighth means coupled to said first means and said sixth means for preventing the initiation of said sixth means during the operation of said first means.

3. The means of claim 2 further comprised of nineth means coupled to said input line and said memory for gating read enable and write strobe signals to said memory in accordance with a command signal received on said input line and at a time determined by said first means.

4. A means for providing automatic operation of a dynamic semiconductor memory of the type requiring periodic refreshing, at least one timing signal to execute, read, write and refresh cycles, and memory command signals to execute read and write operations comprising:

timing means coupled to at least one read or write input line, said timing means including a means for presenting said at least one timing signal upon receipt of a read or write signal, and a means for presenting at least one signal to effect refresh of an addressed portion of said memory upon receipt of a refresh initiate signal;

addressing means for coupling an address to said memory initiated by said read or write signal;

oscillator means for periodically providing a refresh initiate signal to said timing means;

counter means coupled to said oscillator means for sequentially counting through all addresses required to refresh said memory;

gate means for coupling said counter means output to said memory during the operation of said timing means initiated by said oscillator means; and reset means for interrupting and temporarily resetting said timing means as initiated by said oscillator means, upon receipt of a read or write signal, until said read or write operation has been substantially completed by said memory.

5. The means of claim 4 wherein said timing means further includes a means for providing said memory command signals to said memory to execute a read or write operation, a predetermined time after the occurrence of said read or write signal, respectively.

6. For use with a dynamic memory system:

a first timing means initiated by a read or a write signal for providing at least one timing signal useful in causing said memory to execute a read or a write command;

first gate means for gating an address to said memory during the operation of said first timing means;

a second timing means for providing at least one timing signal useful in refreshing said memory;

an oscillator means;

a bistable flip-flop means coupled to said oscillator means for setting by the output of said oscillator means and resetting by a reset signal;

a second gate means for gating the output of said flip-flop means to said second timing means to initiate said second timing means, said second timing means further being coupled to said first timing means and being disabled during at least a substantial portion of the time of operation thereof;

a counter means coupled to said flip-flop means for sequentially counting through a plurality of refresh addresses;

a third gate means for gating the output of said counter means to said memory during the operation of said second timing means; and a reset means for resetting said second timing means upon initiation of said first timing means and reinitiating said timing means upon substantial completion of said timing signals from said first timing means.

7. A method of operating a dynamic memory comprising:

a. coupling an adddress to, and providing first timing signals to, said memory upon the occurrence of a read or write signal;

b. providing a repetitive signal;

c. advancing the count of a counter in response to said repetitive signal to sequentially count through a plurality of refresh address locations;

d. initiating second timing signals responsive to said repetitive signal and coupling the output of the counter to the memory during said second timing signals; and e. inhibiting and resetting said second timing signals upon the occurrence of said first timing signals.

* * * * *